United States Patent
Chou et al.

(10) Patent No.: US 12,436,195 B2
(45) Date of Patent: Oct. 7, 2025

(54) POWER SUPPLY SYSTEM AND FUEL CELL POWER GENERATION PERFORMANCE DETECTION DEVICE AND CONTROL METHOD THEREOF

(71) Applicant: INDUSTRIAL TECHNOLOGY RESEARCH INSTITUTE, Hsinchu (TW)

(72) Inventors: Yuh-Fwu Chou, Zhubei (TW); Ching-Jung Liu, Zhudong Township (TW); Yin-Wen Tsai, Zhubei (TW); Ku-Yen Kang, Zhubei (TW); Chih-Wei Hsu, Zhudong Township (TW)

(73) Assignee: INDUSTRIAL TECHNOLOGY RESEARCH INSTITUTE, Hsinchu (TW)

(*) Notice: Subject to any disclaimer, the term of this patent is extended or adjusted under 35 U.S.C. 154(b) by 163 days.

(21) Appl. No.: 18/386,096

(22) Filed: Nov. 1, 2023

(65) Prior Publication Data
US 2024/0241179 A1    Jul. 18, 2024

Related U.S. Application Data

(60) Provisional application No. 63/421,605, filed on Nov. 2, 2022.

(51) Int. Cl.
  *G01R 31/36*    (2020.01)
  *G01R 31/3842*    (2019.01)
  (Continued)

(52) U.S. Cl.
  CPC ..... *G01R 31/3644* (2013.01); *G01R 31/3842* (2019.01); *G01R 31/389* (2019.01); *H01M 8/04544* (2013.01); *H01M 8/04574* (2013.01)

(58) Field of Classification Search
  None
  See application file for complete search history.

(56) References Cited

U.S. PATENT DOCUMENTS

| | | |
|---|---|---|
| 7,270,900 B2 | 9/2007 | Lecky |
| 8,263,277 B2 | 9/2012 | Davies et al. |
| (Continued) | | |

FOREIGN PATENT DOCUMENTS

| | | |
|---|---|---|
| CN | 101221223 A | 7/2008 |
| CN | 101651214 A | 2/2010 |
| (Continued) | | |

OTHER PUBLICATIONS

Japanese Office Action for Japanese Application No. 2023-187751, dated Jan. 7, 2025, with English translation.

*Primary Examiner* — Jas A Sanghera
(74) *Attorney, Agent, or Firm* — Birch, Stewart, Kolasch & Birch, LLP

(57) ABSTRACT

A power supply system, a fuel cell power generation performance detection device and a control method thereof are provided. The fuel cell has a rated output voltage and an internal resistance having a preset resistance value. The detection device includes a test resistor, a first test switch, a current detection unit and a control unit. The control unit controls the first test switch and the current detection unit to send a first control signal to selectively turn on the first test switch. When the first test switch is turned on, the fuel cell, the test resistor, the first test switch and the current detection unit define a test loop. The current detection unit detects a test current passing through the test loop. The control unit obtains a real-time resistance value of the internal resistance based on the test current to evaluate the power generation performance of the fuel cell.

20 Claims, 11 Drawing Sheets

(51) Int. Cl.
    *G01R 31/389*    (2019.01)
    *H01M 8/04537*   (2016.01)

(56) References Cited

U.S. PATENT DOCUMENTS

| | | |
|---|---|---|
| 2002/0086193 A1 | 7/2002 | Acker et al. |
| 2002/0196025 A1 | 12/2002 | Freeman et al. |
| 2005/0092617 A1 | 5/2005 | Lecky |
| 2008/0014474 A1* | 1/2008 | Yamamoto ........ H01M 8/04126 |
| | | 429/468 |
| 2009/0297894 A1 | 12/2009 | Davies et al. |
| 2015/0024295 A1 | 1/2015 | Hibino et al. |
| 2015/0224894 A1 | 8/2015 | Koo et al. |
| 2022/0284029 A1 | 9/2022 | Yoshida et al. |

FOREIGN PATENT DOCUMENTS

| | | |
|---|---|---|
| CN | 109726452 A | 5/2019 |
| CN | 109726452 B | 10/2020 |
| JP | 10-241886 A | 9/1998 |
| JP | 2002-520779 A | 7/2002 |
| JP | 2003-70161 A | 3/2003 |
| JP | 2009-176491 A | 8/2009 |
| JP | 2013-61303 A | 4/2013 |
| JP | 2021-72216 A | 5/2021 |
| WO | 2017/154310 A1 | 9/2017 |

\* cited by examiner

POWER SUPPLY SYSTEM AND FUEL CELL POWER GENERATION PERFORMANCE DETECTION DEVICE AND CONTROL METHOD THEREOF

This application claims the benefit of U.S. provisional application Ser. No. 63/421,605, filed Nov. 2, 2022, the disclosure of which is incorporated by reference herein in its entirety.

TECHNICAL FIELD

The disclosure relates to a power supply system, a fuel cell power generation performance detection device and a control method thereof.

BACKGROUND

The power generation performance of fuel cells is affected by many factors such as fuel supply flow, ambient air pressure, temperature and humidity, as well as the usage history of each fuel cell stack itself. In the application of vehicles or aircraft, the power generation performance of fuel cells is a key factor in whether the mission can be accomplished safely. Therefore, the power generation performance monitoring of fuel cells is very important. It is used to estimate the energy supply margin for performing tasks and serves as the basis for fuel cell regulation operations or task changes. It is an important technology for fuel cell applications.

SUMMARY

The disclosure is directed to a power supply system, a fuel cell power generation performance detection device and a control method thereof, which can detect and obtain a real-time resistance value of the internal resistance of the fuel cell through a control unit and control the power generation performance of the fuel cell.

According to one embodiment of the present disclosure, a fuel cell power generation performance detection device is provided, which is suitable for detecting a power generation performance of a fuel cell. The fuel cell has a rated output voltage and an internal resistance, and the internal resistance has a preset resistance value. The detection device includes a test resistor, a first test switch, a current detection unit and a control unit. The control unit controls the first test switch and the current detection unit to send a first control signal to selectively turn on the first test switch. When the first test switch is turned on, the fuel cell, the test resistor, the first test switch and the current detection unit define a test loop. The current detection unit detects a test current passing through the test loop, and the control unit obtains a real-time resistance value of the internal resistance based on the test current to evaluate the power generation performance of the fuel cell. An output voltage of the fuel cell is lower than ½ of the rated output voltage and/or a resistance of the test resistor is lower than the preset resistance value of the internal resistance.

According to one embodiment of the present disclosure, a fuel cell power generation performance detection device is provided, which is suitable for detecting a power generation performance of a fuel cell. The fuel cell has a rated output voltage and an internal resistance. The internal resistance has a preset resistance value. The fuel cell power generation performance detection device includes a test resistor, a first test switch, a differential voltage detection unit and a control unit. The control unit controls the first test switch and the differential voltage detection unit to send a first control signal to selectively turn on the first test switch. When the first test switch is turned on, the fuel cell, the test resistor and the first test switch define a test loop, and the differential voltage detection unit detects an upstream end voltage and a downstream end voltage of the test resistor respectively to obtain a differential voltage of the test resistor. The control unit obtains a test current of the test circuit based on the differential voltage and a resistance of the test resistor, and obtains a real-time resistance value of the internal resistance of the fuel cell based on the test current and the rated output voltage of the fuel cell to evaluate the power generation performance of the fuel cell. An output voltage of the fuel cell is lower than ½ of the rated output voltage and/or the resistance of the test resistor is lower than the preset resistance value of the internal resistance. The above-mentioned action of controlling the first test switch to form a test loop and generate a loop current is hereinafter referred to as a "short-circuit operation", and the test current flowing through the loop during this period can also be called a "short-circuit current".

According to one embodiment of the present disclosure, a fuel cell power generation performance detection and control method is provided, which is suitable for detecting a power generation performance of a fuel cell. The fuel cell has a rated output voltage and an internal resistance, and the internal resistance has a preset resistance value, and the fuel cell power generation performance detection and control method includes the following steps. A fuel cell power generation performance detection device is provided. A short-circuit operation is performed. The fuel cell is detected to obtain a real-time resistance value of the internal resistance of the fuel cell. The power generation performance of the fuel cell is evaluated based on the real-time resistance value of the internal resistance of the fuel cell.

According to one embodiment of the present disclosure, a power supply system is provided for supplying power to a load device. The power supply system includes a fuel cell and the above-mentioned fuel cell power generation performance detection device. The fuel cell is electrically connected to the load device and has a rated output voltage and an internal resistance, and the internal resistance has a preset resistance value. The fuel cell power generation performance detection device is connected to the fuel cell and used to detect a power generation performance of the fuel cell. The second test switch is located between the voltage detection unit and the load device. When the first test switch is turned on, the second test switch remains turn off, and the fuel cell outputs the test current to the fuel cell power generation performance detection device. When the first test switch is turned off, the second test switch remains turn on, and the fuel cell outputs an operating current to the load device.

DETAILED DESCRIPTION

The technical solutions in the embodiments of the present disclosure will be clearly and completely described below in conjunction with the accompanying drawings in the embodiments of the present disclosure. Obviously, the described embodiments are part of the embodiments of the present disclosure, rather than all of the embodiments. Based on the embodiments in this disclosure, all other embodiments that can be easily understood by a person of ordinary skills in the art belong to the scope of protection of this disclosure. The following description uses the same/similar symbols to indicate the same/similar components.

Figure 1:
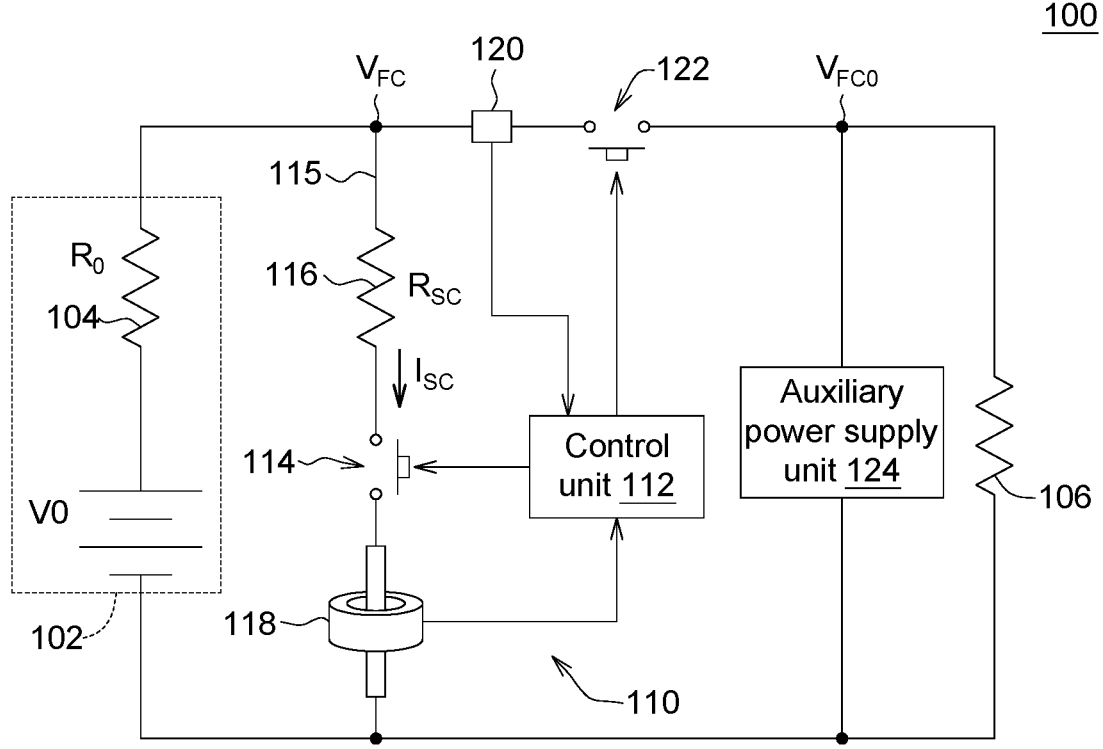
FIG. 1 is a schematic diagram of a fuel cell power generation performance detection device according to an embodiment of the present disclosure.
Figure 2:
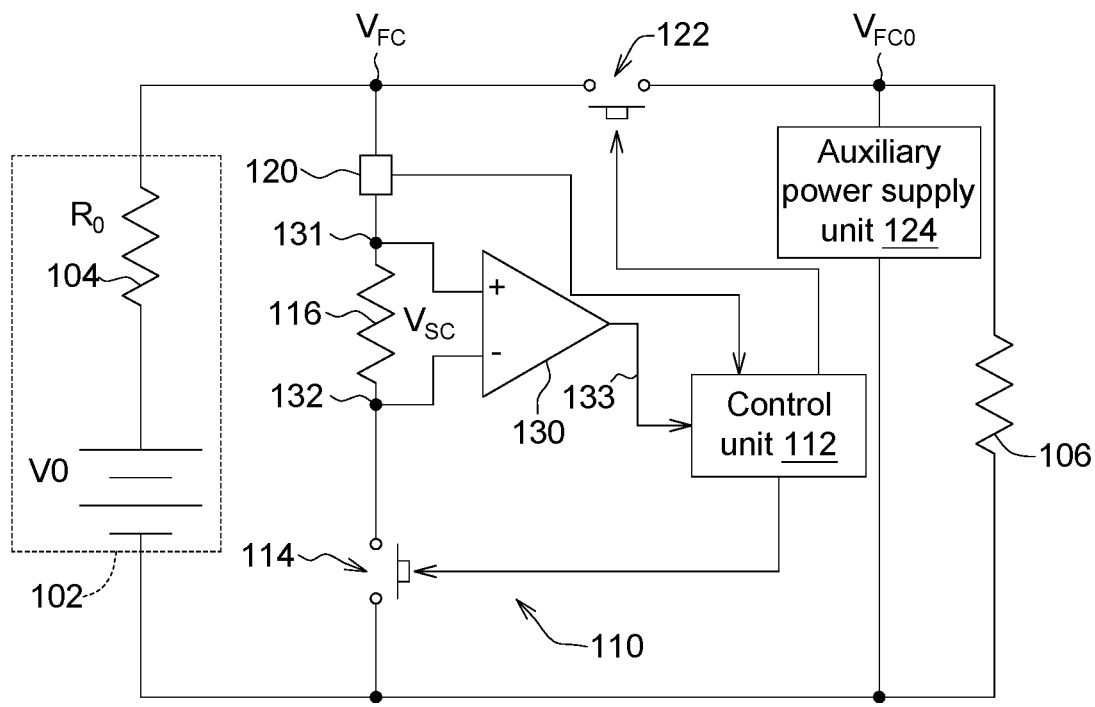
FIG. 2 is a schematic diagram of a fuel cell power generation performance detection device according to another embodiment of the present disclosure.

Referring to FIGS. 1 and 2, FIG. 1 is a schematic diagram of a power supply system 100 and a fuel cell power generation performance detection device 110 thereof according to an embodiment of the present disclosure, and FIG. 2 is a schematic diagram of a power supply system 101 and a fuel cell power generation performance detection device 110 thereof according to another embodiment of the present disclosure. In FIG. 1, the power supply system 100 may include a fuel cell 102, a fuel cell power generation performance detection device 110 and a load device 106. The load device 106 is connected in parallel to both ends of the fuel cell 102, and the fuel cell power generation performance detection device 110 is electrically coupled between the fuel cell 102 and the load device 106. In FIG. 2, the power supply system 101 may include a fuel cell 102, a fuel cell power generation performance detection device 110 and a load device 106. The connection relationship is generally similar to the connection relationship in FIG. 1, and will not be repeated here.

The fuel cell power generation performance detection device 110 of FIG. 1 and the fuel cell power generation performance detection device 110 of FIG. 2 are suitable for detecting a real-time resistance value of the internal resistance 104 of the fuel cell 102, thereby evaluating the power generation performance of the fuel cell 102. For the fuel cell power generation performance detection and control method, please refer to steps S110-S150 in FIG. 3.

The fuel cell 102 has an open circuit voltage V0, such as 68V or higher, and a rated output current, such as 20A. In the case of the rated output current operation, the fuel cell 102 has a rated output voltage $V_{FC0}$, such as 48V. The fuel cell 102 is electrically connected to a load device 106 to output an operating current and an operating voltage to the load device 106. Generally speaking, the fuel cell 102 includes a plurality of fuel cell units connected in series, and these fuel cell units are stacked into a fuel cell stack so that the potential of the fuel cell 102 can be increased sequentially. For example, the potential of the fuel cell 102 can be provided as 48V according to design requirements or can be adjusted according to actual voltage conditions. The output voltage of the fuel cell 102 is determined by the number of fuel cell units. The greater the number, the higher the voltage, and the lower the number, the lower the voltage. However, as the fuel cell 102 supplies power, the power generation performance of the fuel cell 102 permanently or temporarily declines due to aging of the internal catalyst material or water accumulation in the anode hydrogen flow channel, resulting in a decrease in output power, which will be shown in significant increase of real-time internal resistance. For performance degradation caused by factors such as a small amount of water accumulation in the gas flow channel, the real-time internal resistance change can be detected and dealt with in time to avoid more serious performance degradation. Therefore, the power generation performance of the fuel cell 102 can be evaluated through the fuel cell power generation performance detection device 110 as a basis for the regulation operation of the fuel cell 102.

For example, taking the hydrogen fuel cell 102 of a 30 kg single-axis unmanned helicopter as an example, in order to provide a maximum takeoff weight of 35 kg, the maximum power required for takeoff, hovering or performing tasks may exceed 4 KW, and the unmanned helicopter is equipped with four sets of fuel cells 102 each with 1 kW rated power (about 72 fuel cell units connected in series) and a 48 V and 12 amp-hour high-power lithium-ion battery to provide higher instantaneous power required for various conditions.

When the output current of the fuel cell 102 is 20 A and the rated output voltage $V_{FC0}$ is 48 V, the output power of the fuel cell 102 is about 960 W. When the fuel cell 102 is used in a power supply system 100 that requires high power, such as a vehicle or an aircraft, it often requires continuous high power and large current output. At this time, the output voltage $V_{FC}$ of the fuel cell 102 and the real-time resistance value of the internal resistance 104 also change with load. In order to ensure that the vehicle or aircraft can immediately keep the performance of the fuel cell 102 well during mission, the present disclosure adds the fuel cell power generation performance detection device 110 to the power supply system 100 and 101 to detect the internal resistance 104 of the fuel cell 102 in real time. The real-time resistance value is used as an indicator to evaluate the power generation performance of the fuel cell. In addition, the fuel cell power generation performance detection device 110 can also be used for offline detection and is not limited to real-time detection.

Referring to FIG. 1, the fuel cell power generation performance detection device 110 includes a control unit 112, a first test switch 114, a test resistor 116 and a current detection unit 118. The control unit 112 is, for example, a processor, an integrated circuit or a system-on-a-chip (SoC). The first test switch 114 is connected to the control unit 112, and the first test switch 114 can receive a control signal (such as a turn-on signal or a turn-off signal) from the control unit 112. The control signal is, for example, a short pulse signal. As shown in FIG. 1, the test resistor 116 and the current detection unit 118 are connected to both ends of the fuel cell 102 respectively. The first test switch 114 is located between the test resistor 116 and the current detection unit 118, and the control unit 112 is adapted to send a first control signal to the first test switch 114 to selectively turn on the first test switch 114. When the first test switch 114 is turned on, the fuel cell 102, the test resistor 116, the first test switch 114 and the current detection unit 118 define a test loop 115. The test loop 115 is a closed loop, and the first test switch 114 is, for example, a short-circuit test switch. Therefore, when the first test switch 114 is turned on, the fuel cell 102 instantly releases the test current $I_{SC}$ (i.e., the short-circuit current), and passes through the test resistor 116 and the current detection unit 118 accordingly.

Since the test current $I_{SC}$ instantaneously released by the fuel cell 102 is proportional to the power generation performance of the fuel cell 102, the greater the test current $I_{SC}$ instantaneously released by the fuel cell 102, the lower the real-time resistance value of the internal resistance 104 of the fuel cell 102. On the contrary, the lower the test current $I_{SC}$ instantaneously released by the fuel cell 102, the greater the real-time resistance value of the internal resistance 104 of the fuel cell 102. Therefore, when the first test switch 114 is turned on, the control unit 112 detects the test current $I_{SC}$ through the test circuit 115 based on the current detection unit 118 and can immediately calculate the real-time resistance value of the internal resistance 104 to grasp the power generation performance change of the fuel cell 102. The current detection unit 118 is, for example, a Hall current detector, an ammeter or the like. For the calculation method of the real-time resistance value of the internal resistance 104 of the fuel cell 102, please refer to the following description.

In one embodiment, the resistance $R_{SC}$ of the selected test resistor 116 is, for example, lower than the preset resistance value $R_0$ of the internal resistance 104 of the fuel cell 102. For example, when the preset resistance value $R_0$ of the internal resistance 104 of the fuel cell 102 is 1 ohm (Ω), the selected resistance $R_{SC}$ of the test resistor 116 may be 0.1Ω or lower. When the resistance $R_{SC}$ of the selected test resistor 116 is close to or slightly larger than the preset resistance value $R_0$ of the internal resistance 104 of the fuel cell 102, the heat dissipation power generated by the test resistor 116 increases during the passage of the test current $I_{SC}$ (i.e., the first test switch 114 is turned on). For example, when the preset resistance value $R_0$ of the internal resistance 104 of the fuel cell 102 is 1Ω and the resistance $R_{SC}$ of the selected test resistor 116 is 5.8Ω, before the first test switch 114 is turned on, the output voltage $V_{FC}$ of the fuel cell 102 is 68 V; when the first test switch 114 is turned on, the test current $I_{SC}$ detected by the current detection unit 118 is 68/(1+5.8) =10 A. In this case, the heat dissipation power (that is, the power consumption) $P_T$ generated by the test resistor 116 during the passage of the test current $I_{SC}$ is $I_{SC}*(I_{SC}*R_{SC})$ =10*58=580 W, that is, the heat dissipation power generated by the test resistor 116 is significantly increased.

On the other hand, when the preset resistance value $R_0$ of the internal resistance 104 of the fuel cell 102 is 1Ω, and the resistance $R_{SC}$ of the selected test resistor 116 is 0.01Ω (that is, the resistance $R_{SC}$ of the selected test resistor 116 is less than the preset resistance value $R_0$ of the internal resistance 104 of the fuel cell 102), before the first test switch 114 is turned on, the output voltage $V_{FC}$ of the fuel cell 102 is 68V; when the first test switch 114 is turned on, the test current $I_{SC}$ detected by the current detection unit 118 is 68/(1+0.01) =67.3 A, and the cross-voltage $V_{SC}$ on the test resistor 116 is approximately 67.3 A*0.01=0.673 V. The heat dissipation power $P_T$ generated by the test resistor 116 during the passage of test current is $I_{SC}*V_{SC}$=67.3*0.673≈45.3 W, that is, the heat dissipation power generated by the test resistor 116 is significantly reduced. Therefore, in this embodiment, it is appropriate that the selected resistance $R_{SC}$ of the test resistor 116 is lower than the preset resistance value $R_0$ of the internal resistance 104 of the fuel cell 102. The resistance $R_{SC}$ of the test resistor 116 is, for example, in the range between ⅕ and 1/100 of the preset resistance value $R_0$ of the internal resistance 104 of the fuel cell 102, but the disclosure is not limited thereto.

In one embodiment, when the first test switch 114 is turned on, the output voltage $V_{FC}$ of the selected fuel cell 102 is, for example, less than ½ of the rated output voltage $V_{FC0}$. In another embodiment, when the first test switch 114 is turned on, the output voltage $V_{FC}$ of the selected fuel cell 102 is, for example, less than 1/10 of the rated output voltage $V_{FC0}$; in this case, it can be regarded as the resistance $R_{SC}$ of the test resistor 116 is approximately 1/10 of the preset resistance value $R_0$ of the internal resistance 104 of the fuel cell 102, so that the technical effect of limiting the output voltage $V_{FC}$ is equivalent to the technical effect of limiting the resistance $R_{SC}$ of the test resistor 116.

Each stack of the fuel cell 102 can provide with an independent stack balance of plant (BOP) according to design requirements. In addition to starting or shutting down the power generation of each stack according to the power required during the flight, and the stack temperature, air flow and fuel supply during the power generation, the fuel cell power generation performance detection device 110 of this embodiment can also be used to periodically evaluate the power generation performance of each stack of the fuel cell 102 by the power generation performance detection and control method shown in FIG. 3 to keep up on the performance of each stack, and update the stack performance status obtained during each flight operation in the recording device of the stack balance of plant. When the test record of one of the stacks is obviously different from that of other stacks (for example, the difference is more than 20%), indicating that the performance of the stack may be declining, and the stack could be replaced or repaired to maintain the fuel cell 102 in good performance.

Figure 4:
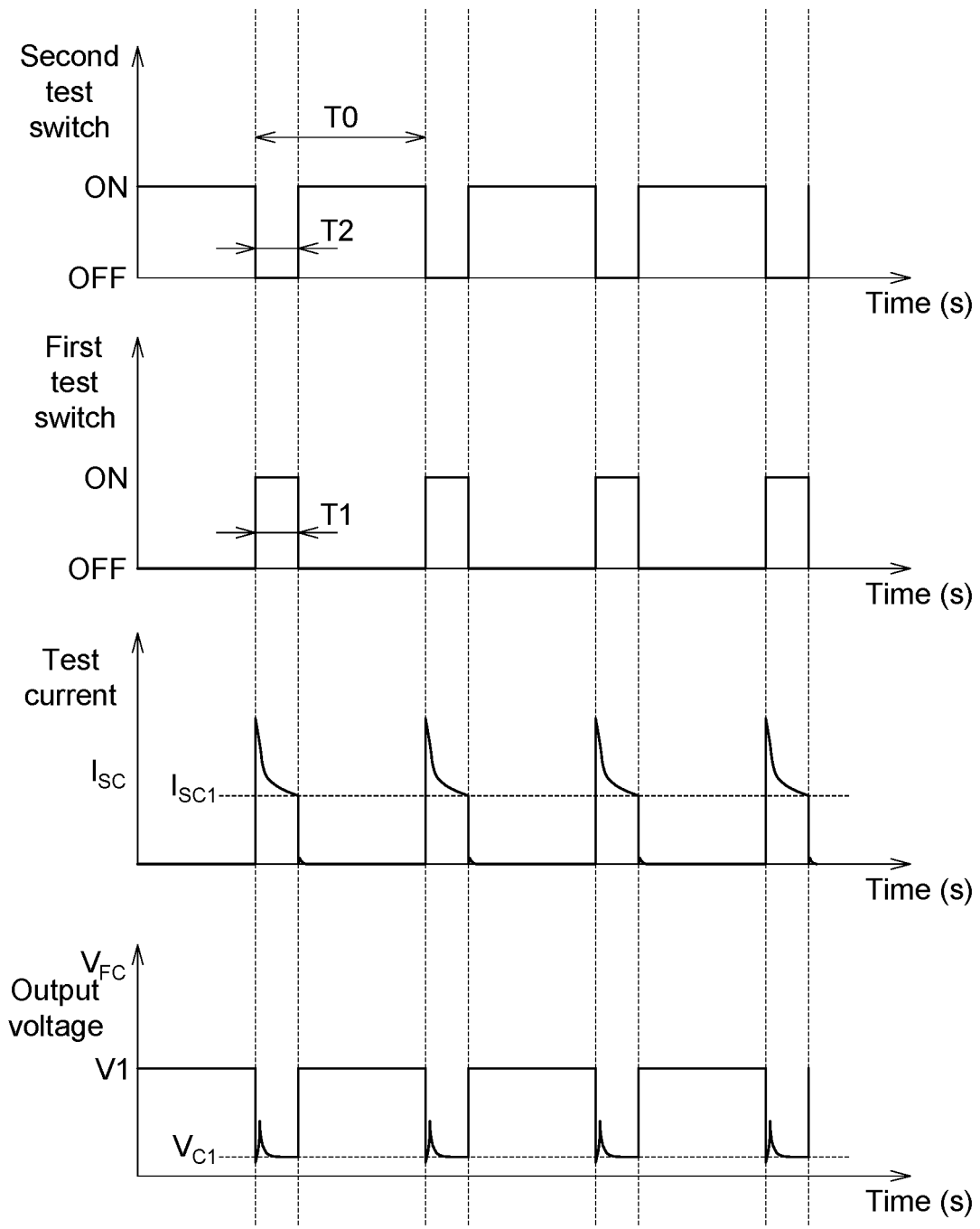
FIG. 4 shows a waveform diagram for short-circuit operation.

Referring to FIG. 1, the fuel cell power generation performance detection device 110 may also include a voltage detection unit 120 and a second test switch 122 that are controlled by and connected to the control unit 112. The voltage detection unit 120 is located at the output end of the fuel cell 102. The second test switch 122 is located between the voltage detection unit 120 and the load device 106, and the control unit 112 can send a second control signal to selectively turn on the second test switch 122. When neither the first test switch 114 nor the second test switch 122 is turned on, the voltage detection unit 120 detects the open circuit voltage of the fuel cell 102. When the control unit 112 sends the first control signal to turn on the first test switch 114, the first test switch 114 is in turn-on state, and the fuel cell 102 outputs the test current $I_{SC}$ to the fuel cell power generation performance detection device 110. At this time, the second test switch 122 maintains an open loop state to prevent the output voltage $V_{FC}$ of the fuel cell 102 from affecting the operating voltage of the load device 106 during the period when the first test switch 114 is turned on. On the contrary, when the first test switch 114 is turned off and the control unit 112 sends a second control signal to turn on the second test switch 122, the second test switch 122 remains in the turn-on state, and the operating voltage of the load device 106 is equal to the output voltage $V_{FC}$ of the fuel cell 102. At this time, the fuel cell 102 does not output the test current $I_{SC}$, but outputs an operating voltage V1 to the load device 106, as shown in FIG. 4.

In one embodiment, when the first test switch 114 is turned on, the control unit 112 can calculate the real-time resistance value $R_0$ of the internal resistance 104 according to the output voltage change of the fuel cell 102 and the test current $I_{SC}$ measured by the current detection unit 118. According to the changing trend of the real-time resistance value of the internal resistance 104 of the fuel cell 102, the control unit 112 can evaluate whether the power generation performance of the fuel cell 102 has deteriorated, especially the performance degradation caused by poor control of the internal temperature and humidity conditions of the fuel cell 102 or the aging of battery materials, a more significantly change will occur in the real-time resistance value of the internal resistance 104 of the fuel cell 102.

In one embodiment, when the internal temperature, air humidity and hydrogen pressure of the fuel cell 102 affect the performance change of the fuel cell 102, the control unit 112 can notify the power supply system 100 or 101 to adjust the speed of the cooling fan to the cathode of the fuel cell 102 to reduce the internal temperature of the fuel cell 102, adjust the operating voltage of the fuel cell 102, perform anode water removal or short-circuit humidification (i.e., maintaining the humidity of the proton exchange membrane) or the like to maintain the fuel cell 102 in good performance.

Referring to FIG. 2, the fuel cell power generation performance detection device 110 includes a control unit 112, a first test switch 114, a test resistor 116, a voltage detection unit 120, and a differential voltage detection unit 130. The difference between the fuel cell power generation performance detection devices 110 in FIG. 1 and FIG. 2 lies in the differential voltage detection unit 130, the configuration design and control operations related to the differential voltage detection unit 130. The differential voltage detection unit 130 has a first input terminal 131, a second input terminal 132 and an output terminal 133. The first input terminal 131 is electrically coupled to the upstream end of the test resistor 116 for inputting a voltage signal at the upstream end. The second input terminal 132 is electrically coupled to the downstream end of the test resistor 116 for inputting a voltage signal at the downstream end. The output terminal 133 is electrically coupled to the control unit 112 for transmitting voltage signals from the upstream end and the downstream end. The differential voltage detection unit 130 is adapted to detect the cross voltage $V_{SC}$ (that is, the test current $I_{SC}$ multiplied by the resistance $R_{SC}$ of the test resistor 116 is equal to the cross voltage $V_{SC}$ across the test resistor 116; $V_{SC}=I_{SC}*R_{SC}$) through the two ends of the test resistor 116 (i.e., the upstream end and the downstream end) when the first test switch 114 is turned on in order to avoid being affected by the voltage change across the first test switch 114. The differential voltage detection unit 130 is, for example, a differential amplifier, which has an amplification factor and is suitable for adjusting/amplifying the voltage across the test resistor 116 at a specific magnification. In one embodiment, the resistance $R_{SC}$ of the selected test resistor 116 is, for example, between 1/5 and 1/100 of the preset resistance value $R_0$ of the internal resistance 104 of the fuel cell. Therefore, when the control unit 112 measures the cross voltage $V_{SC}$ across the test resistor 116 and obtains the test current $I_{SC}$ based on this cross voltage $V_{SC}$, since the resistance $R_{SC}$ of the test resistor 116 is much lower than the preset resistance value $R_0$ of the internal resistance 104 of the fuel cell 102, the resistance $R_{SC}$ of the test resistor 116 is negligible, and the real-time resistance value of the internal resistance 104 of the fuel cell 102 is calculated from the test current $I_{SC}$, where the real-time resistance value is approximately V0/$I_{SC}$.

The relationship connected between the fuel cell 102, the control unit 112, the first test switch 114, the test resistor 116, the second test switch 122 and the voltage detection unit 120 in FIG. 2 has been described in detail in the above embodiment, which will not be described here.

Figure 3:
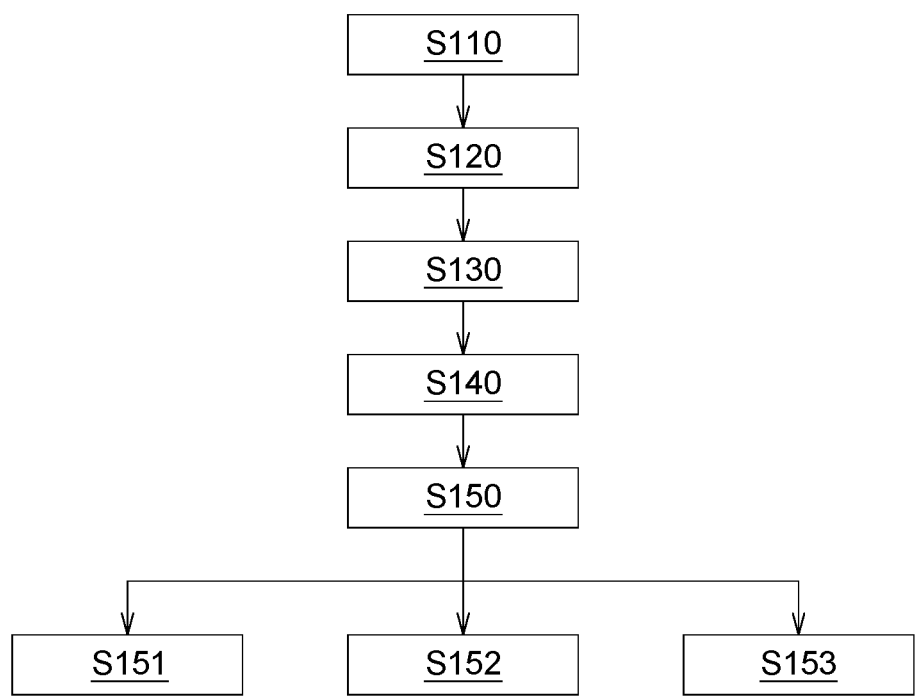
FIG. 3 is a schematic diagram of a fuel cell power generation performance detection and control method according to an embodiment of the present disclosure.

Referring to FIG. 3, a schematic diagram of the power generation performance detection and regulation method for a fuel cell 102 according to an embodiment of the present disclosure is illustrated. The power generation performance detection and regulation method for the fuel cell 102 is suitable for detecting a power generation performance of the fuel cell 102 and includes the following steps S110 to S140. In step S110, a fuel cell power generation performance detection device 110 is provided, wherein the fuel cell power generation performance detection device 110 has preset parameters such as short-circuit operation period and reading time for measurement. Since the configuration design and operation steps of the fuel cell power generation performance detection device 110 have been described in detail above, please refer to FIGS. 1 and 2 and will not be repeated here. Next, in step S120, a short-circuit operation is performed. In step S130, a real-time resistance value of the internal resistance 104 of the fuel cell 102 is detected. Thereafter, in step S140, the power generation performance of the fuel cell 102 is evaluated based on the real-time resistance value.

In step S120, the short-circuit operation is, for example, repeatedly turning on and off the first test switch 114 at least once to detect a test current $I_{SC}$ passing through the test resistor 116 (as shown in FIG. 1) or to detect a cross voltage $V_{SC}$ across the test resistors 116 (as shown in FIG. 2). As shown in FIG. 1, when the first test switch 114 is turned on, a test current $I_{SC}$ passing through the test circuit is detected by the current detection unit 118, and the control unit 112 obtains the real-time resistance value of the internal resistance 104 of the fuel cell 102 based on the test current $I_{SC}$. Alternatively, as shown in FIG. 2, the control unit 112 sends a first control signal to control the first test switch 114 to turn on, the differential voltage detection unit 120 detects the cross voltage $V_{SC}$ across the test resistor 116, and the control unit 112 obtains the test current $I_{SC}$ based on the cross voltage $V_{SC}$ to evaluate the real-time resistance value of the internal resistance 104 of the fuel cell 102.

Referring to FIG. 4, a waveform diagram of short-circuit operation is shown. When the first test switch 114 is turned on (ON) and the second test switch 122 is turned off (OFF), the detected test current $I_{SC}$ and output voltage $V_{FC}$ have obvious changes; when the first test switch 114 is turned off (OFF) and the second test switch 122 remains turn on (ON), the detected test current $I_{SC}$ is 0, and the output voltage $V_{FC}$ is, for example, the operating voltage V1. The number of times the first test switch 114 is turned on (ON) may be one or more times, and the duration T1 of each turn-on period may be a fixed value or variable. In order to show that the power generation performance of the fuel cell 102 during short-circuit operation is relatively close to the performance when the current is continuously output in a real situation, the turn-on duration T1 of the first test switch 114 and the turn-off duration T2 of the second test switch 122 are greater than 20 ms, for example, between 50 ms and 500 ms. The turn-on duration T1 and the turn-off duration T2 may be the same or different, depending on the design requirements; the design of the above short-circuit operation duration can prevent the transient current provided by the electrical double-layer capacitance effect of the fuel cell 102 from covering up the problem of insufficient continuous discharge performance of the fuel cell 102. In addition, in order to avoid the problem that the short-term accumulated heat inside the fuel cell 102 has no time to dissipate and cause a temperature rise due to too frequent testing, the ratio of the duration T0 of the two adjacent short-circuit operations and the turn-on duration T1 of the first test switch 114 are is, for example, more than 100 times (that is, T0/T1>100), and the duration T0 between two adjacent short-circuit operations is, for example, greater than 5 seconds (5000 ms), but the disclosure is not limited thereto.

In order to solve the problem caused by the excessive rated power of the test resistor 116, the fuel cell power generation performance detection and control method reduces the rated power required by the test resistor 116 by significantly reducing the resistance $R_{SC}$ of the test resistor 116. In one embodiment, when the first test switch 114 is turned on, an output voltage $V_{FC}$ of the fuel cell 102 is less than ½ of the rated output voltage $V_{FC0}$ and/or the resistance $R_{SC}$ of the test resistor 116 is less than the preset resistance value $R_0$ of the internal resistance 104. At the same time, as the resistance $R_{SC}$ of the selected test resistor 116 is lower, the test current $I_{SC}$ is higher instead, and the cross voltage $V_{SC}$ of the test resistor 116 decreases more, so that the heat dissipation power generated by the test resistor 116 is lower.

In addition, in order to avoid the capacitive effect of the fuel cell 102 from covering up the problem of insufficient continuous discharge performance of the fuel cell 102, in one embodiment, when the first test switch 114 is turned on, the turn-on duration T1 of the first test switch 114 is not less than tens to hundreds of milliseconds (for example, between 50 ms and 500 ms).

Therefore, during the turn-on period of the first test switch 114, although the test resistor 116 with a lower resistance will cause the output voltage $V_{FC}$ to be close to a short circuit (i.e., $V_{FC} \approx V_{SC1}$), the real-time resistance value of the internal resistance 104 can be obtained immediately through the above short-circuit operation to be used as an indicator of changes in the power generation performance of the fuel cell 102. Furthermore, after the fuel cell 102 has been used for a period of time, the performance of the fuel cell 102 deteriorates due to passivation of partial platinum catalyst. The fuel cell 102 can be reactivated through the fuel cell stack performance control in the subsequent step S150 to restore the performance of the fuel cell 102.

The short-term short-circuit operation can be designed to adjust the duration T1 during the turn-on period of the first test switch 114. The duration T1 is, for example, between 50 ms and 500 ms, and the reaction rate of the fuel cell 102 is limited by the supply rate of the external fuel. The reactants of the cathode and the anode are supplied externally rather than stored a large amount in the electrode. Therefore, the short-circuit operation will not cause damage or safety hazards. Under appropriate conditions, the short-circuit operation may also have a positive effect to improve the power generation performance of the fuel cell 102 and reactivate the fuel cell 102.

Referring to FIGS. 1 and 2, the power supply system 100 and 101 may further include an auxiliary power supply unit 124 connected in parallel to both ends of the fuel cell 102 with the load device 106. The auxiliary power supply unit 124 is, for example, a secondary battery (such as a lithium battery), an electrical double-layer capacitor, or at least another fuel cell. The auxiliary power supply unit 124 is adapted to continuously provide the operating current required by the load device 106 during the turn-off period T2 of the second test switch 122, so as to avoid the significant drop in the output voltage $V_{FC}$ of the fuel cell 102 during the turn-off period T2 of the second test switch 122, which may cause the operating voltage of the load device 106 to be too low, causing the load device 106 to operate abnormally.

On the other hand, keeping the second test switch 122 turn off during the turn-on period of the first test switch 114 can also avoid that the auxiliary power supply unit 124 supplying power to the load device 106 reversely provides more current into the test resistor 116 via the power supply line, which may cause the detection information obtained by the current detection unit 118 or the differential voltage detection unit 130 to be affected by the auxiliary power supply unit 124.

Figure 5:
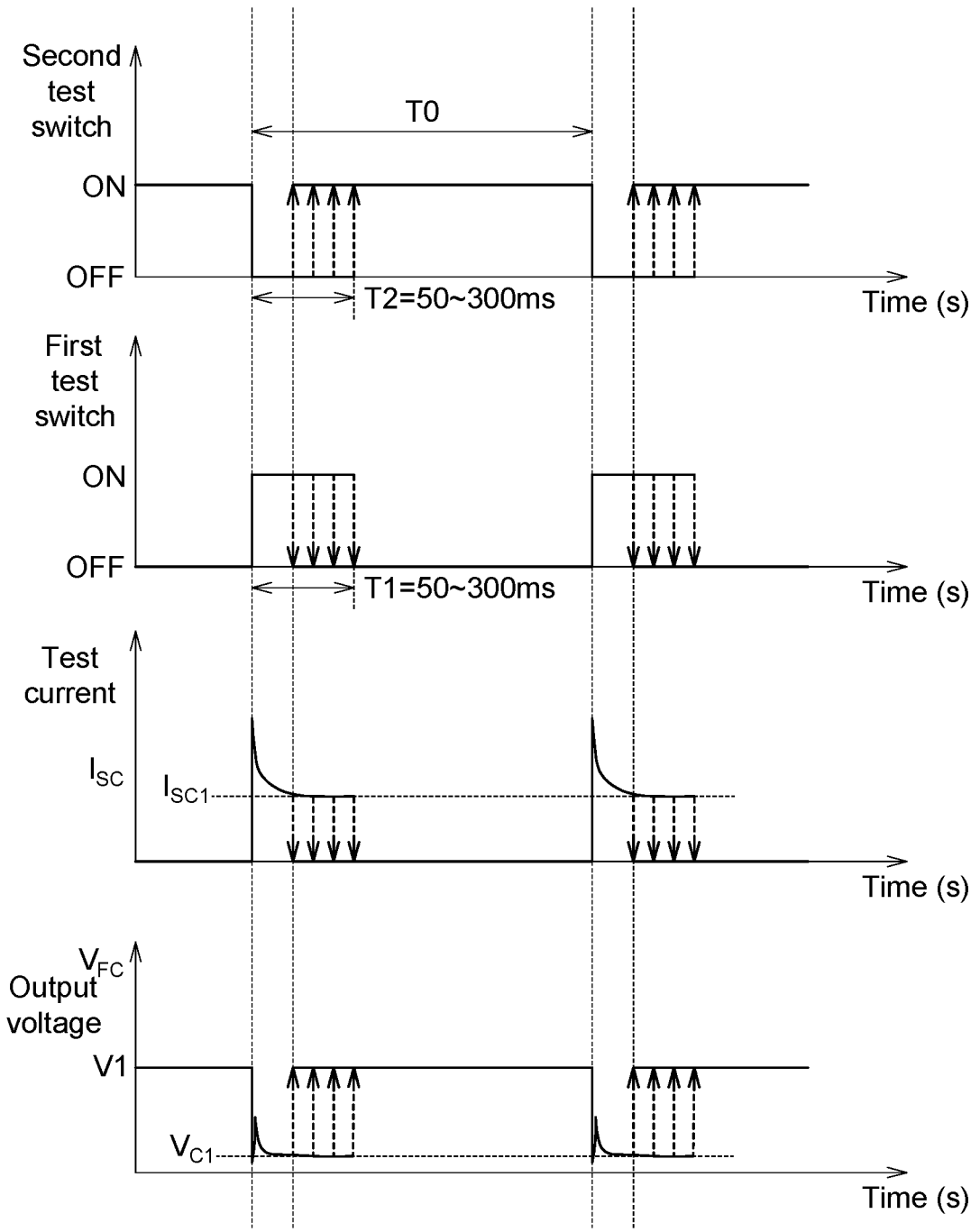
FIG. 5 shows a waveform diagram for adjusting the duration of a short-circuit activation operation.

Referring to FIG. 3, in one embodiment, the fuel cell power generation performance detection and control method may also include step S150 of activating the power generation performance of the fuel cell 102. For example, in step S150, the first test switch 114 is repeatedly turned on and off at least once to perform one or more short-circuit activation operations, as shown in FIG. 5. Activating the power generation performance of the fuel cell 102 may include step S151 of adjusting the duration of the short-circuit activation operation, for example, increasing the duration from 50 ms to 300 ms, so as to improve the power generation performance of the fuel cell 102 and restore the activity of the fuel cell 102. In another embodiment, activating the power generation performance of the fuel cell 102 may include step S152 of adjusting the period of the short-circuit activation operation, for example, changing it from once every 10 seconds to once every 5 seconds, thereby improving the power generation performance of the fuel cell 102 and restoring the activity of the fuel cell 102. In another embodiment, activating the power generation performance of the fuel cell 102 may include step S153 of replacing or repairing the fuel cell stack to improve the power generation performance of the fuel cell 102. Various embodiments are described in detail below.

Referring to FIG. 5, a waveform diagram according to an embodiment of the present disclosure is illustrated. In step S151, the short-circuit activation operation of the fuel cell 102 is performed periodically, for example, every 10 seconds (10,000 ms, T0), and the duration T1 of the short-circuit activation operation is slowly adjusted, for example, from 50 ms to 300 ms, so that the test current $I_{SC}$ passing through the test resistor 116 during the short-circuit activation operation (that is, during the turn-on period of the first test switch 114) is used as the current of the pulse load test. In order to ensure that the currents of the pulse load test read by the control unit 112 during different short-circuit activation operations have a reference value that can be compared with each other, the current of the pulse load test is compared with the current data obtained at a fixed time point of 50 ms, so as to ensure that there will be no difference in the pulse load current test during the short-circuit operation (the duration T1 such as 50 ms, 100 ms, 200 ms or 300 ms).

Figure 6:
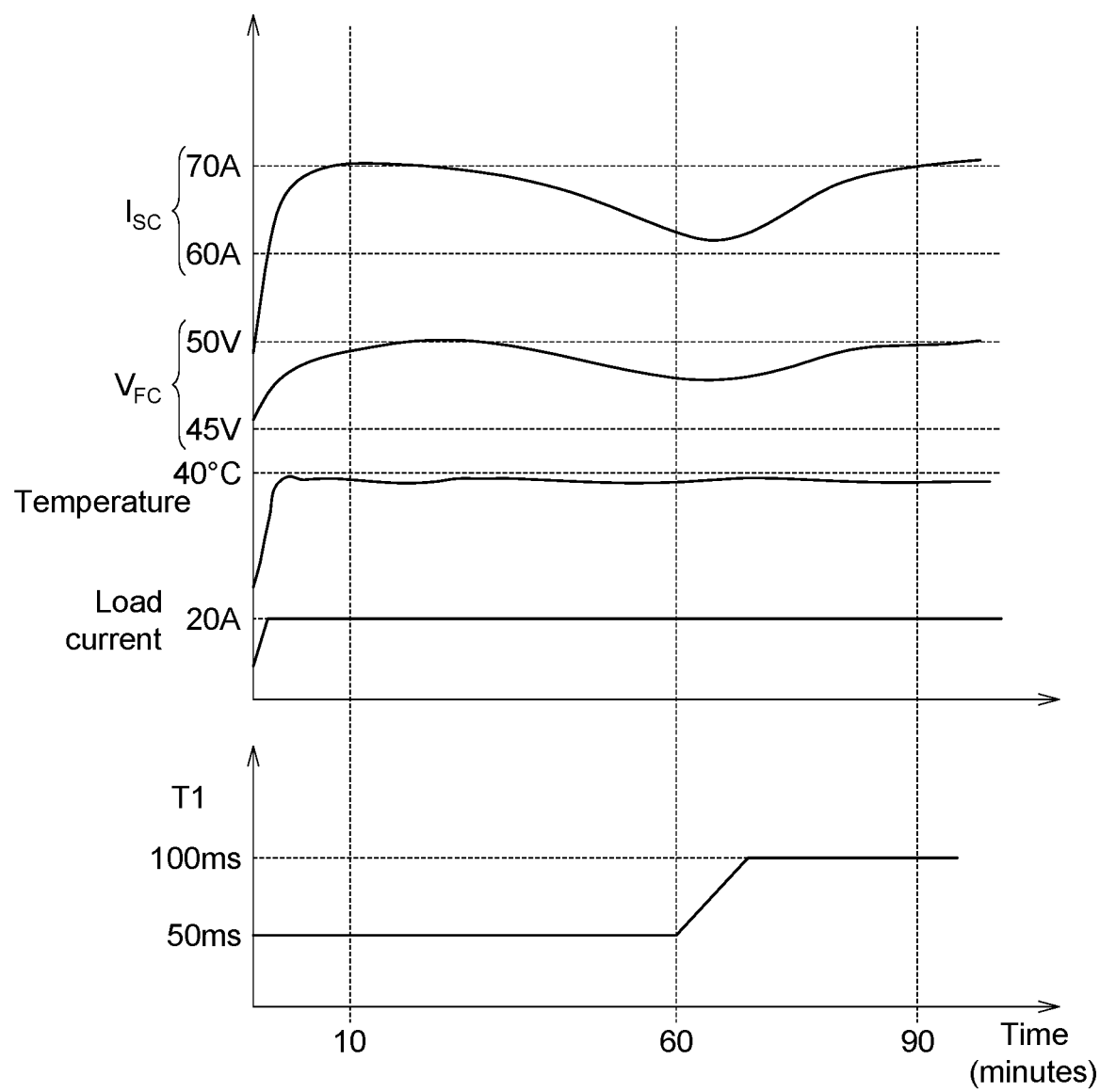
FIG. 6 is a schematic diagram illustrating an example of adjusting the duration of the short-circuit activation operation in FIG. 5.

Referring to FIG. 6, a schematic diagram illustrating an example of adjusting the duration of the short-circuit activation operation in FIG. 5 is illustrated. First, the fuel cell 102 is heated and the temperature is stably controlled between 38 and 40 degrees Celsius. Then, the fuel cell 102 discharges the load device 106 with a constant current (for example, 20 A), so that the output voltage $V_{FC}$ of the fuel cell 102 rises from 47 V to 50 V slowly, the output power increases from 950 W to 1000 W. At this time, the current value of the test current $I_{SC}$ of the fuel cell 102 during the short-circuit operation (the duration T1 is about 50 ms) rises steadily to about 70 A. However, after the control unit 112 has been continuously operated for 60 minutes, the test current $I_{SC}$ begins to slowly decrease to close to 60 A, and the output voltage $V_{FC}$ of the fuel cell 102 drops from the initial 50 V to 47.5 V. At this time, the voltage $V_{FC}$ of the fuel cell 102 decreases under a stable fixed load, indicating that the output power of the fuel cell 102 decreases (that is, the power generation performance decreases) because the catalyst begins to passivate, indicating that a 50 ms short-circuit operation every 10 seconds is insufficient for activating the fuel cell 102.

As shown in FIG. 6, in this embodiment, in order to further improve the performance of the fuel cell 102 back to 1000 W, the duration T1 of the short-circuit activation period is slowly adjusted to increase from 50 ms to 100 ms (as shown in FIG. 5), while the short-circuit activation period is maintained once every 10 seconds. After 30 minutes of continuous activation, the generated power of the fuel cell 102 returned to 1000 W, the output voltage $V_{FC}$ of the fuel cell 102 returned to 50 V, and the test current $I_{SC}$ also returned to 70 A.

Figure 7:
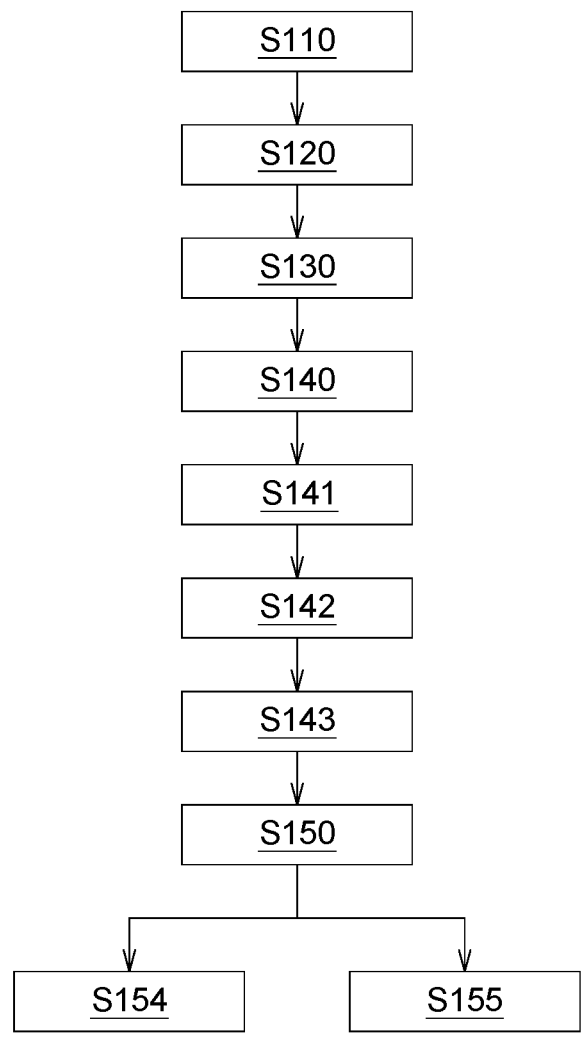
FIG. 7 is a schematic diagram of a fuel cell power generation performance detection and control method according to another embodiment of the present disclosure.
Figure 9:
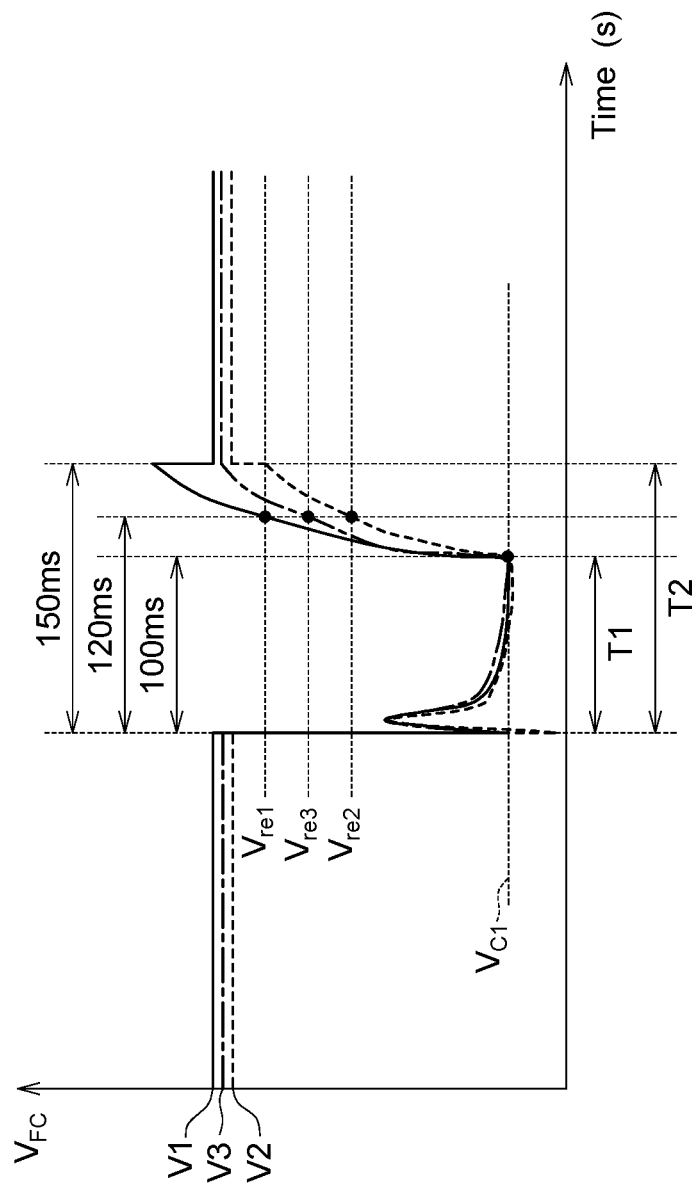
FIG. 9 is a waveform diagram of a recovery reference voltage difference for evaluating the performance index of the fuel cell stack in FIG. 7.

Referring to FIG. 7, a schematic diagram of a fuel cell power generation performance detection and control method is illustrated according to another embodiment of the present disclosure. In one embodiment, the fuel cell power generation performance detection and control method includes the following steps S110 to S150. The same steps have been described above and will not be repeated here. The difference is that in step S140, the power generation of the fuel cell 102 is evaluated. For example, the power generation performance is evaluated based on the correlation of the real-time resistance value, the recovery reference voltage difference and the predetermined threshold, which includes steps S141 to S143. In step S141, after the short-circuit operation ends, the load time is delayed to increase the turn-off duration T2 of the second switch; in step S142, after the short-circuit operation ends (i.e., the first switch is turned off), at a specific time point before the second switch is turned on (for example, delayed by 20 ms), the recovery reference voltage difference is detected in order to compare the voltage recovery rate; in step S143, the fuel cell stack performance index of the fuel cell 102 is evaluated based on the correlation between the recovery reference voltage difference and the predetermined threshold. In step S150, activating power generation performance of the fuel cell 102 further includes S154-S155. In step S154, when the recovery reference voltage difference of the fuel cell 102 is less than a predetermined threshold, the control unit 112 can notify the power supply system 100 and 101 to shorten the scavenging and purge cycle, and actively increase the frequency of scavenging and purge to clean the anode water and make the power generation performance of the fuel cell 102 is improved; in step S155, when the recovery reference voltage difference of the fuel cell 102 is greater than the predetermined threshold, the first test switch 114 is repeatedly turned on and off at least once to perform one or several short-circuit activation operations, the control unit 112 can improve the power generation performance of the fuel cell 102 by adjusting the duration T1 of the short-circuit activation operation period and/or adjusting the cycle of short-circuit activation period. Regarding the comparison of the voltage recovery rate mentioned in step S142, more specifically, it is to compare the proportion of fuel cell voltage rise after the first test switch 121 is turned off (stop short-circuit) and before the second test switch 122 is turned on. In this embodiment, the recovery reference voltage difference is detected at a time point of 20 ms after the first test switch 121 is turned off. As shown in FIG. 9, the three sets of curves with different voltage recovery rates in the period between 100 ms and 150 ms, the three recovery reference voltage differences are $\Delta V_{re1}$, $\Delta V_{re2}$, $\Delta V_{re3}$ respectively, where $\Delta V_{re1}=(V_{re1}-V_{C1})$; $\Delta V_{re2}=(V_{re2}-V_{C1})$; $\Delta V_{re}=(V_{re3}-V_{C1})$. However, for simplicity and clarity, the comparison described below will only be explained based on the comparison of $\Delta V_{re}$, $\Delta V_{re2}$, $\Delta V_{re3}$.

Figure 8:
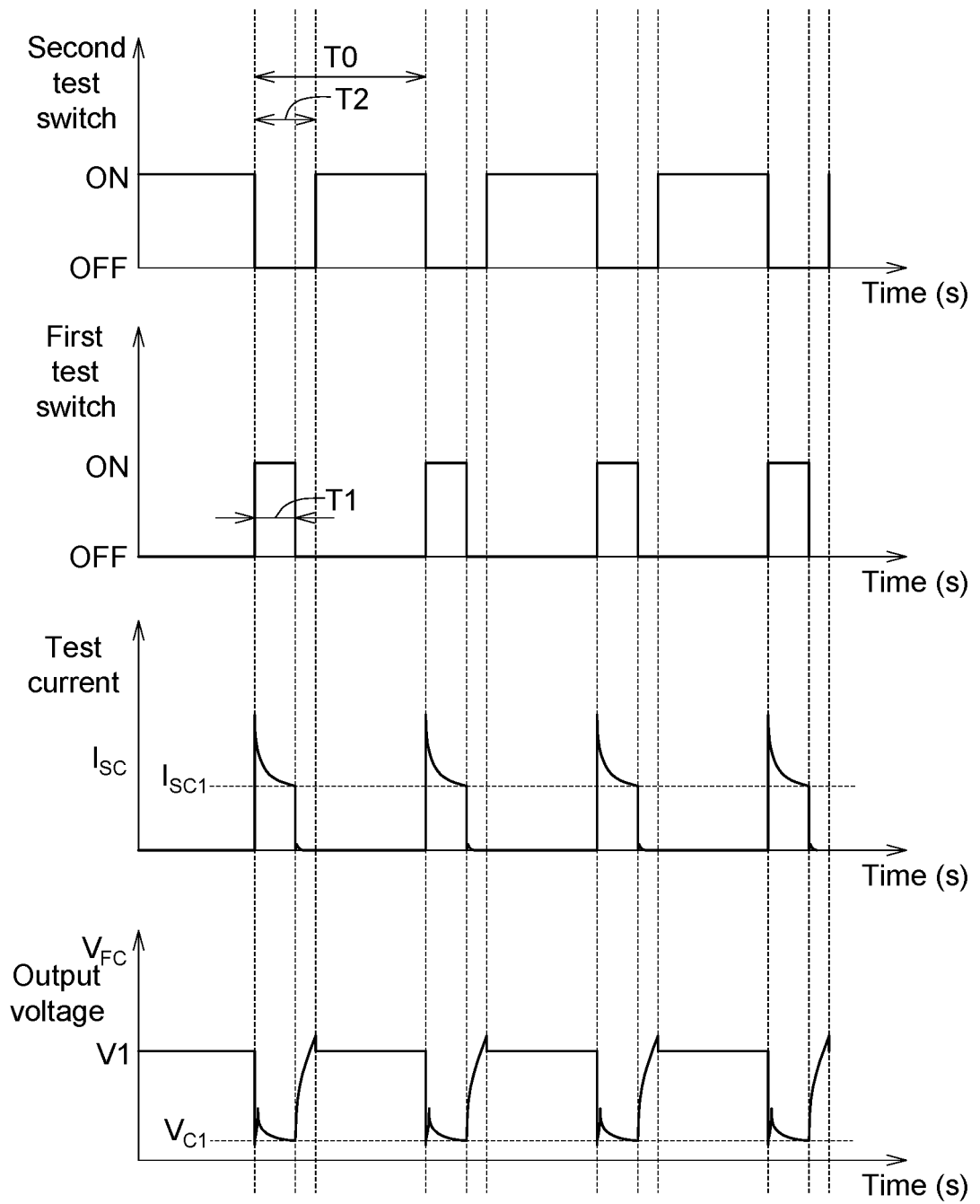
FIG. 8 is a waveform diagram of a load supply time being delayed after the end of the short-circuit operation in FIG. 7.

Referring to FIGS. 8 and 9, FIG. 8 shows the waveform diagram of the delayed load time after the short-circuit operation in FIG. 7. FIG. 9 shows the recovery reference voltage for evaluating the performance index of the fuel cell stack in FIG. 7. In one embodiment, the short-circuit operation of the fuel cell 102 is performed periodically every 10 seconds (i.e., T0), and the duration T1 of the short-circuit operation period is, for example, 100 ms. When the short-circuit operation period ends, the load time is provided with a delay, for example, 50 ms (i.e., T2−T1), so that the duration T2 of the turn-off period of the second test switch 122 is approximately 150 ms, which is greater than the duration T1 of the turn-on period of the first test switch 114, so that the output voltage $V_{FC}$ of the fuel cell 102 is recovered at the time that the first and the second test switches 121 and 122 are both turned off to obtain the recovery reference voltage difference. In one embodiment, increasing the duration T2 of the turn-off period of the second test switch 122 (that is, T2>T1) will cause the output voltage $V_{FC}$ of the fuel cell 102 to recover, and the control unit 112 can calculate the recovery reference voltage difference of the fuel cell 102 respond based on the load time and the read short-circuit voltage $V_{C1}$. Theoretically, the output power of the fuel cell 102 increases as the demand of the load device 106 increases. When the operating current of the load device 106 increases, the temperature of the fuel cell 102 rises up. Although the temperature drops significantly after the air is dissipated by the accelerating fan, the test current $I_{SC}$ still continues to decrease slowly (about $I_{SC1}$), which means that the output voltage $V_{FC}$ and output power also continue to decrease (for example, the output voltage $V_{FC}$ decreases from $V_1$ to $V_2$). The waveform diagram of the recovery reference voltage difference for evaluating the fuel cell stack performance index in FIG. 7 shows that the power generation performance of the fuel cell 102 is not ideal. Therefore, in step S143, during the monitoring of the recovery reference voltage difference, it is estimated that the proportion of voltage rise has slowed down and the voltage recovery rate has slowed down, and it is determined that there may be water accumulation on the anode of the fuel cell 102; in step S154, after at least one active scavenging and purge, in addition to the recovery of the voltage recovery rate, the test current $I_{SC}$ also increase significantly, showing that under the guidance of the fuel cell stack performance index of the fuel cell 102, after correctly identifying possible factors and eliminating the problems, the power generation performance of the fuel cell 102 can be restored as soon as possible.

Referring to FIG. 9, during the delayed turn-off period of the second test switch 122 (for example, between 100 ms and 150 ms), the recovery reference voltage at a time point is measured, such as the recovery reference voltage at the time point of 120 ms, that is, $V_{re1}$, $V_{re2}$, $V_{re3}$, but the disclosure is not limited thereto, and the recovery reference voltage differences (i.e., $\Delta V_{re1}$, $\Delta V_{re2}$, $\Delta V_{re3}$) of multiple recovery reference voltages $V_{re1}$, $V_{re2}$, $V_{re3}$ at the same time point are compared to determine whether the difference is greater than or equal to a predetermined threshold (the predetermined threshold is, for example, lower than 95% of the ideal voltage difference, but is not limited). When the recovery reference voltage difference gradually decreases from $\Delta V_{re1}$ to $\Delta V_{re2}$ ($\cong \Delta V_{re1} \times 0.90$, lower than $\Delta V_{re1} \times 0.95$), it means that the voltage recovery rate has become obviously slow and abnormal. Therefore, in step S155, by adjusting the duration T1 of the short-circuit operation period (for example, 50 ms, 100 ms, 200 ms or 300 ms) and/or adjusting the short-circuit activation period (for example, once every 5 seconds instead of once every 10 seconds) to improve the performance of the fuel cell 102. For example, in FIG. 9, $V_{C1}$ represents the short-circuit voltage of the fuel cell 102 during the short-circuit operation under different degrees of water accumulation. When the recovery reference voltage is in the range from $V_{re1}$ to $V_{re3}$, it means that the operating voltage ($V_1$ to $V_3$) of the fuel cell 102 is in the normal range, the recovery reference voltage difference is not less than the preset threshold ($\Delta V_{re} \approx \Delta V_{re} \times 0.95$), and is still in an acceptable state. When the recovery reference voltage is in the range from $V_{re2}$ to $V_{re}$, it means that the operating voltage ($V_2$ to $V_3$) of the fuel cell 102 has not returned to normal. The recovery reference voltage difference is less than the predetermined threshold, and the fuel cell stack performance control needs to be performed. For example, in step S154, the power generation performance of the fuel cell 102 can be improved through at least one active scavenging and purge. In addition to recovering the voltage recovery rate, the test current $I_{SC}$ will also increase significantly.

Figure 10:
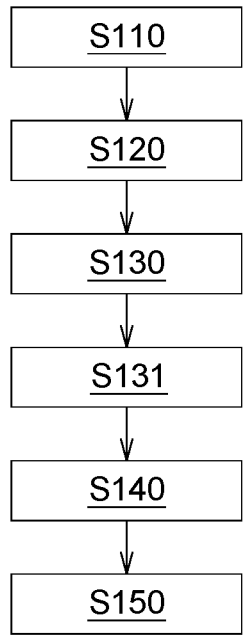
FIG. 10 is a schematic diagram of a fuel cell power generation performance detection and control method according to an embodiment of the present disclosure.
Figure 11:
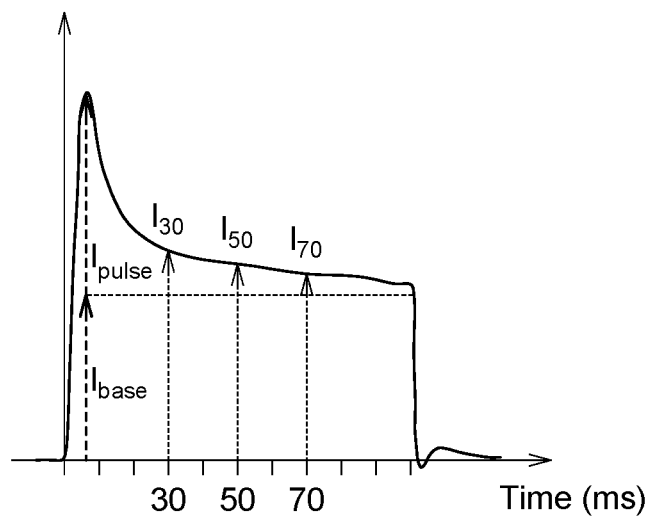
FIG. 11 is a waveform diagram of a real-time current value in FIG. 10.

Referring to FIGS. 10 and 11, FIG. 10 is a schematic diagram of a fuel cell power generation performance detection and control method according to another embodiment of the present disclosure, and FIG. 11 is a waveform diagram of the real-time current value in FIG. 10. In one embodiment, the power generation performance detection and control method of the fuel cell 102 includes the following steps S110 to S150. The same steps have been described above and will not be repeated here. The difference is that step S130 is performed to obtain the real-time resistance value of the internal resistance 104 of the fuel cell 102, and further includes step S131 to detect the real-time current value of the fuel cell 102. In one embodiment, the control unit selects at least three time points (but the disclosure is not limited thereto) to measure the real-time current value of the fuel cell 102, thereby obtaining an effective index for determining changes in the internal reaction impedance of the fuel cell 102. In addition, in step S140, the power generation performance of the fuel cell 102 is evaluated based on the real-time resistance value and the real-time current value. For example, in FIG. 11, the duration T1 of the short-circuit operation period is, for example, 100 ms, and multiple measurement time points are selected during the short-circuit operation period, for example, a time point is set every 20 ms, and measured at 30, 50, 70 ms, but not limited thereto. The real-time current values obtained at three time points of 30 ms, 50 ms and 70 ms are $I_{30}$, $I_{50}$ and $I_{70}$ respectively. Each real-time current value includes a fixed current component $I_{base}$ and a current component $I_{px}$ that slowly decays according to a fixed time constant (i.e., the decay rate). As shown in FIG. 11, three unknown numbers can be calculated from the real-time current values of $I_{30}$, $I_{50}$ and $I_{70}$ through algebraic operations: a fixed current component $I_{base}$, a current component $I_{px}$ that gradually decays and disappears over time (or peak value in the starting value $I_{pulse}$ of the current at approximately zero time point) and the decay rate (the decay time constant t) are calculated. The fixed current component $I_{base}$ is the final stable short-circuit current after the transient response disappears. In an experiment of one embodiment, the cathode and anode of the fuel cell are supplied with high-humidity air and hydrogen fuel respectively for power generation operation for about 50 minutes. Due to the accumulation of water inside the fuel cell 102, the power generation performance gradually decreased and finally reached about 23%. During this period, the above method is used to continuously perform the short-circuit operation. The currents obtained at three time points of 30 ms, 50 ms and 70 ms each time are $I_{30}$, $I_{50}$ and $I_{70}$ respectively. Based on this, the $I_{base}$ current during each short-circuit operation is monitored. Among them, the short-circuit current data ($I_{base}$) captured four times at the beginning, 10 minutes, 20 minutes, and 50 minutes of the experiment are 53.5 A, 33.0 A, 24.2 A, and 17.2 A respectively. It can be seen that obvious changes in the short-circuit current data, providing early warning in the early stages of water accumulation. Based on this current component $I_{base}$, not only can it be provided as a test current for the control unit 112 to calculate the real-time resistance value, thereby evaluating the power generation performance of the fuel cell 102, but it can also be used as an effective performance index to determine whether the water inside the stack of the fuel cell 102 is accumulated to reflect the gas diffusion resistance inside the fuel cell 102.

Figure 12:
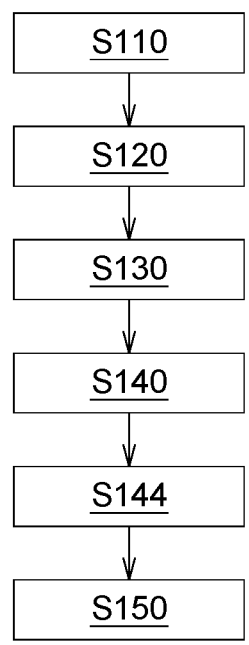
FIG. 12 is a schematic diagram of a fuel cell power generation performance detection and control method according to another embodiment of the present disclosure.
Figure 13:
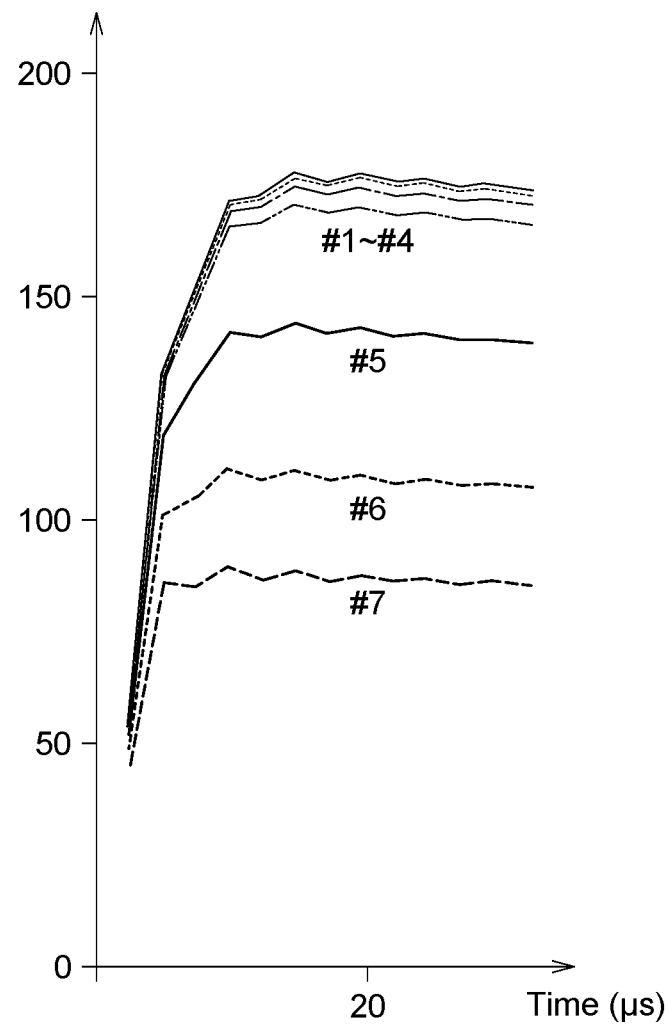
FIG. 13 is a waveform diagram of the current peak value at the initial moment of the short-circuit operation in FIG. 12.

Referring to FIGS. 12 and 13, FIG. 12 is a schematic diagram of a fuel cell power generation performance detection and control method according to another embodiment of the present disclosure, and FIG. 13 illustrates a waveform diagram of a peak current at the initial moment of short circuit in FIG. 12. In one embodiment, the power generation performance detection and control method of the fuel cell 102 includes the following steps S110 to S150. The same steps have been described above and will not be repeated here. The difference is that when the step S140 is performed based on the real-time resistance value to evaluate the power generation performance of the fuel cell 102, the method further includes step S144. The control unit 112 can perform the step S144 during a preset initial period of the short-circuit operation (for example, starting from 5 ms to 5000 ms after the first test switch 114 is turned on) to capture, record and compare real-time current data to obtain the current peak value at the initial moment of the short-circuit operation. By recording peak values during periodic short-circuit operations, changes in current peak values during different short-circuit operations are compared to obtain changes in conductive properties of the ion conductive membrane of the fuel cell 102, thereby evaluating the fuel cell stack performance index of the fuel cell 102. The conductivity properties of this ion conductive membrane are mainly ohmic characteristics, and the peak current has a greater influence at the initial moment of the short circuit test. Therefore, it is suitable to detect whether the ion conductive membrane is in a better state from the peak current at the initial moment of the short circuit. Although, in theory, the voltage change of the fuel cell 102 is characterized by resistance and capacitance, the current is maximum at the beginning of the short-circuit test, and then gradually decreases. However, due to the unavoidable inductance effect on the short-circuit operation formed by the fuel cell 102 and the first test switch 114, the current peak occurrence time at the initial moment of the short-circuit is delayed by several microseconds or hundreds of microseconds. In order to capture and record the correct current peak value at the initial moment of the short circuit, a relatively high-speed and dense sampling rate and analog/digital conversion rate are required during this period, so as not to miss the peak current occurrence time. Alternatively, those who are familiar with such analog/digital signal processes can also use a peak detection and hold circuit to hold the current peak signal appearing in this time for a longer period of time for the control unit 112 to use in a slower sampling period so that the current peak value at the initial moment of the short-circuit operation can also be captured. In one embodiment, the control unit 112 may provide a peak detection and hold circuit so that the control unit 112 can capture the current peak value at the initial moment of the short-circuit operation.

For example, in FIG. 13, in order to detect the fuel cell stack performance of the fuel cell 102 with the current peak value at the initial moment of the short-circuit operation, a short circuit impedance of 0.7 milliohms is used in the embodiment and the pulse response of the short-circuit in frequency domain is calculated based on the measured impedance spectrum of the fuel cell 102. After examining the time domain response from fast Fourier transform (FFT), it can be seen that the current peak value at the initial moment of the short-circuit operation usually occurs within a short period of time (for example, 5 to 15 ms) after the first test switch 114 is turned on. Data graphs #1 to #4 are peak current waveforms at the initial moment of the short circuit obtained by using hydrogen and air with normal humidity in the fuel cell under regular operating conditions; while data graphs #5 to #7 are the peak current waveforms obtained during the experiments using hydrogen and air that have been dewatered and dried to pass through the cathode and anode respectively, for about 45 minutes, and the power generation performance of the fuel cell 102 gradually decreases by about 10%. The analysis results of the impedance spectrum obtained through testing are shown in the three groups #5, #6, and #7 of the short-circuit current waveforms in FIG. 13. In order to compare the differences in the peak currents of the three groups, a time magnification view is used in FIG. 13 to detect the current waveforms at the moment of 30 microseconds from the beginning of the short circuit to show differences in respective current peak values. From the current peak value at the initial moment of the short-circuit operation, it can be seen that the power generation performance of the fuel cell 102 has declined due to dry gas, and its peak current has dropped more significantly (from the peak current about 144 A of #5 to the peak current about 89.67 A of #7, the difference is about 37%, which has clear discrimination). By comparing the current waveforms of #1 to #4 with peak currents from 177.6 A to 170.8 A that have not changed significantly, it can be seen that the impedance change of the proton exchange/conducting membrane in the fuel cell 102 is significantly increased as shown by the high frequency response. Therefore, through the detection of the current peak value at the initial moment of the short-circuit operation in this embodiment, like the detection of the high-frequency impedance point in the spectrogram, it can be used to early predict whether the impedance change of the proton exchange/conduction membrane of the fuel cell 102 occurs due to abnormal drying or other factors so as to evaluate the fuel cell stack performance index of the fuel cell 102.

The subsequent step S150 and the sub-steps S151 to S155 of activating the power generation performance of the fuel cell 102 have been described in the above embodiments and do not repeat here. It is possible to choose any one of the first embodiment (step S151), the second embodiment (step S152), and the fourth embodiment (step S131) to evaluate the power generation performance of the fuel cell 102, while it is also possible to select any one of the first embodiment (step S151), the second embodiment (step S152), and the fourth embodiment (step S131) to combine the third embodiment (steps S141-S143, S154-S155) and the fifth embodiment (step S144) respectively according to actual needs. These embodiments can be performed simultaneously or sequentially to more effectively evaluate the power generation performance of the fuel cell 102, but the disclosure is not limited thereto.

The power supply system and the fuel cell power generation performance detection device and the control method thereof according to the above embodiments of the present disclosure can detect and evaluate the real-time power generation performance of the fuel cell through the control unit and activate the fuel cell to maintain the fuel cell in good operating condition. In particular, when the fuel cell is used in power supply systems that require high power, such as vehicles or aircrafts, the power supply system and the fuel cell power generation performance detection device and the control method of the present disclosure can ensure that the vehicles or aircrafts keep watching the performance changes of the fuel cell when facing harsh environments such as airflow changes and flight vibrations during mission execution, and the power generation performance of the fuel cell can be maintained in good condition by reducing the internal temperature of the fuel cell, adjusting the operating voltage of the fuel cell, purging water from the anode, and short-circuit humidification. In one embodiment, the real-time resistance value of the internal resistance obtained by the fuel cell power generation performance detection and control method can be used as an index of the performance change of the fuel cell, and can be adjusted by adjusting the duration of the short-circuit activation operation and the period of the short-circuit activation operation, delaying the duration of the turn-off period of the second test switch, detecting the recovery reference voltage difference, detecting the real-time current value and/or detecting the current peak value at the initial moment of the short-circuit operation, to improve the power generation performance of the fuel cell and evaluate the fuel cell stack performance index. The power supply system and the fuel cell power generation performance detection device and the control method thereof in the embodiments can also be used in a static performance detection or a load simulation system to determine whether the fuel cell power generation performance has declined as a basis for the fuel cell stack performance index of the fuel cell.

It will be apparent to those skilled in the art that various modifications and variations can be made to the disclosed embodiments. It is intended that the specification and examples be considered as exemplars only, with a true scope of the disclosure being indicated by the following claims and their equivalents.

What is claimed is:

1. A fuel cell power generation performance detection device, suitable for detecting a power generation performance of a fuel cell, the fuel cell having a rated output voltage and an internal resistance, and the internal resistance having a preset resistance value, the fuel cell power generation performance detection device comprising:
   a test resistor;
   a first test switch;
   a current detection unit; and
   a control unit for controlling the first test switch and the current detection unit to send a first control signal to selectively turn on the first test switch;
   when the first test switch is turned on, the fuel cell, the test resistor, the first test switch and the current detection unit define a test loop, the current detection unit detects a test current passing through the test loop, and the control unit obtains a real-time resistance value of the internal resistance of the fuel cell based on the test current to evaluate the power generation performance of the fuel cell;

wherein an output voltage of the fuel cell is lower than ½ of the rated output voltage and/or a resistance of the test resistor is lower than the preset resistance value of the internal resistance.

2. The fuel cell power generation performance detection device according to claim 1, wherein the current detection unit comprises a Hall current detector.

3. The fuel cell power generation performance detection device according to claim 1, wherein the resistance of the test resistor is between ⅕ and 1/100 of the preset resistance value of the internal resistance.

4. The fuel cell power generation performance testing device according to claim 1, further comprises a voltage detection unit and a second test switch that are controlled by and connected to the control unit, the control unit is configured to send a second control signal to selectively turn on the second test switch, when neither the first test switch nor the second test switch is turned on, the voltage detection unit detects an open circuit voltage of the fuel cell.

5. A fuel cell power generation performance detection device, suitable for detecting a power generation performance of a fuel cell, the fuel cell having a rated output voltage and an internal resistance, and the internal resistance having a preset resistance value, the fuel cell power generation performance detection device comprising:
a test resistor;
a first test switch;
a differential voltage detection unit; and
a control unit for controlling the first test switch and the differential voltage detection unit to send a first control signal to selectively turn on the first test switch;
when the first test switch is turned on, the fuel cell, the test resistor and the first test switch define a test loop, and the differential voltage detection unit detects an upstream end voltage and a downstream end voltage of the test resistor respectively to obtain a differential voltage of the test resistor, the control unit obtains a test current of the test circuit based on the differential voltage and a resistance of the test resistor, and obtains a real-time resistance value of the internal resistance of the fuel cell based on the test current and the rated output voltage of the fuel cell to evaluate the power generation performance of the fuel cell;
wherein an output voltage of the fuel cell is lower than ½ of the rated output voltage and/or the resistance of the test resistor is lower than the preset resistance value of the internal resistance.

6. The fuel cell power generation performance detection device according to claim 5, wherein the resistance of the test resistor is between ⅕ and 1/100 of the preset resistance value of the internal resistance.

7. The fuel cell power generation performance testing device according to claim 5, wherein the differential voltage detection unit has a first input terminal electrically coupled to the upstream end of the test resistor for inputting a voltage signal at the upstream end, and a second input terminal electrically coupled to the downstream end of the test resistor for inputting another voltage signal at the downstream end, and an output terminal electrically coupled to the control unit for transmitting the voltage signals from the upstream end and the downstream end.

8. The fuel cell power generation performance detection device according to claim 5, wherein the differential voltage detection unit comprises a differential amplifier.

9. A fuel cell power generation performance detection and control method, suitable for detecting a power generation performance of a fuel cell, the fuel cell having a rated output voltage and an internal resistance, and the internal resistance having a preset resistance value, the method comprising:
providing a fuel cell power generation performance detection device according to claim 4;
performing a short-circuit operation;
detecting the fuel cell to obtain a real-time resistance value of the internal resistance of the fuel cell; and
evaluating the power generation performance of the fuel cell based on the real-time resistance value.

10. The fuel cell power generation performance detection and control method according to claim 9, wherein detecting the fuel cell to obtain the real-time resistance value of the internal resistance of the fuel cell further comprises:
selecting at least three time points to detect the real-time current value of the fuel cell during a short-circuit operation.

11. The fuel cell power generation performance detection and control method according to claim 10, further comprises evaluating a performance index of the fuel cell based on the real-time current values.

12. The fuel cell power generation performance detection and control method according to claim 11, wherein evaluating the performance index of the fuel cell comprises:
capturing, recording and comparing a real-time current data during an initial period of the short-circuit operation, a current peak value at an initial moment of the short circuit is obtained periodically, and changes in the current peak values during different short-circuit operations are compared to evaluate the performance index of the fuel cell.

13. The fuel cell power generation performance detection and control method according to claim 9, further comprising activating the power generation performance of the fuel cell.

14. The fuel cell power generation performance detection and control method according to claim 13, wherein activating the power generation performance of the fuel cell comprises:
repeating turning on and off the first test switch at least once to perform one or several short-circuit activation operations; and
adjusting a duration and/or a period of the short-circuit activation operation.

15. The fuel cell power generation performance detection and control method according to claim 13, wherein activating the power generation performance of the fuel cell comprises replacing or repairing a stack of the fuel cell.

16. The fuel cell power generation performance detection and control method according to claim 9, wherein evaluating the fuel cell power generation performance comprises:
increasing a duration of a turn-off period of the second test switch so that the duration of the turn-off period of the second test switch is greater than a duration of a turn-on period of the first test switch;
detecting the fuel cell to obtain a recovery reference voltage difference of the fuel cell; and
evaluating a performance index of the fuel cell based on a correlation between the recovery reference voltage difference and a predetermined threshold.

17. The fuel cell power generation performance detection and control method according to claim 16, wherein evaluating the performance index of the fuel cell based on the correlation between the recovery reference voltage difference and the predetermined threshold comprises:
measuring a recovery reference voltage at a time point, and compare whether the recovery reference voltage differences at the same time point during different short-circuit operations is greater than the predetermined threshold.

18. The fuel cell power generation performance detection and control method according to claim 17, further comprising activating the power generation performance of the fuel cell, wherein:
when the recovery reference voltage difference is less than the predetermined threshold, at least one scavenging and purge is performed; and
when the recovery reference voltage difference is greater than the predetermined threshold, repeatedly turning on and off the first test switch at least once to perform one or several short-circuit activation operations, and adjusting a duration and/or a period of the short-circuit activation operation.

19. A power supply system for supplying power to a load device, the power supply system comprising:
a fuel cell electrically connected to the load device and having a rated output voltage and an internal resistance, the internal resistance having a preset resistance value; and
a fuel cell power generation performance detection device according to claim 4 connected to the fuel cell to detect a power generation performance of the fuel cell;
wherein the second test switch is located between the voltage detection unit and the load device;
when the first test switch is turned on, the second test switch remains turn off, and the fuel cell outputs a test current to the fuel cell power generation performance detection device;
when the first test switch is turn off, the second test switch remains turn on, and the fuel cell outputs an operating current to the load device.

20. The power supply system according to claim 19, wherein the fuel cell power generation performance detection device further comprises an auxiliary power supply unit, and the auxiliary power supply unit and the load device are connected in parallel to both ends of the fuel cell.

* * * * *